United States Patent [19]

Narita et al.

[11] 4,438,324

[45] Mar. 20, 1984

[54] ELECTRIC RICE COOKER

[75] Inventors: Ryuho Narita; Kenji Yamamori, both of Nagoya; Hiroyuki Oota, Iwakura; Terutaka Aoshima, Toyohashi, all of Japan

[73] Assignee: Tokyo Shibaura Denki Kabushiki Kaisha, Kawasaki, Japan

[21] Appl. No.: 443,893

[22] Filed: Nov. 23, 1982

[30] Foreign Application Priority Data

Dec. 21, 1981 [JP] Japan ............................. 56-207332
Dec. 21, 1981 [JP] Japan ............................. 56-207333
Dec. 27, 1981 [JP] Japan ............................. 56-207334

[51] Int. Cl.$^3$ ............................................. F27D 11/02
[52] U.S. Cl. ..................................... 219/441; 99/333; 219/433; 219/438; 219/492; 219/494; 219/510; 219/521
[58] Field of Search ............... 219/429, 430, 433, 438, 219/439, 441, 442, 492, 493, 494, 509, 510, 521; 99/332, 333

[56] References Cited

U.S. PATENT DOCUMENTS

| 4,313,051 | 1/1982 | Aoshima | 219/441 |
| 4,315,138 | 2/1982 | Miva | 219/441 |
| 4,315,139 | 2/1982 | Ohnishi et al. | 219/441 |
| 4,362,923 | 12/1982 | Aoshima | 219/441 |
| 4,401,884 | 8/1983 | Kusunoki et al. | 219/492 |

Primary Examiner—Volodymyr Y. Mayewsky
Attorney, Agent, or Firm—Cushman, Darby & Cushman

[57] ABSTRACT

An electric rice cooker is disclosed which has a cooking pot or kettle for containing rice and water, a removable lid member covering the top of the kettle, an electrical heater provided adjacent to the outside surface of the kettle for heating the kettle and the contents thereof, a thermal insulating frame structure, and a control section which includes a kettle temperature detector and a control circuit for controlling the heater so as to allow the rice to automatically and properly absorb water in accordance with the actual kettle temperature immediately after the cooking operation is started, but before the rice is substantially changed to alpha-starch.

10 Claims, 2 Drawing Figures

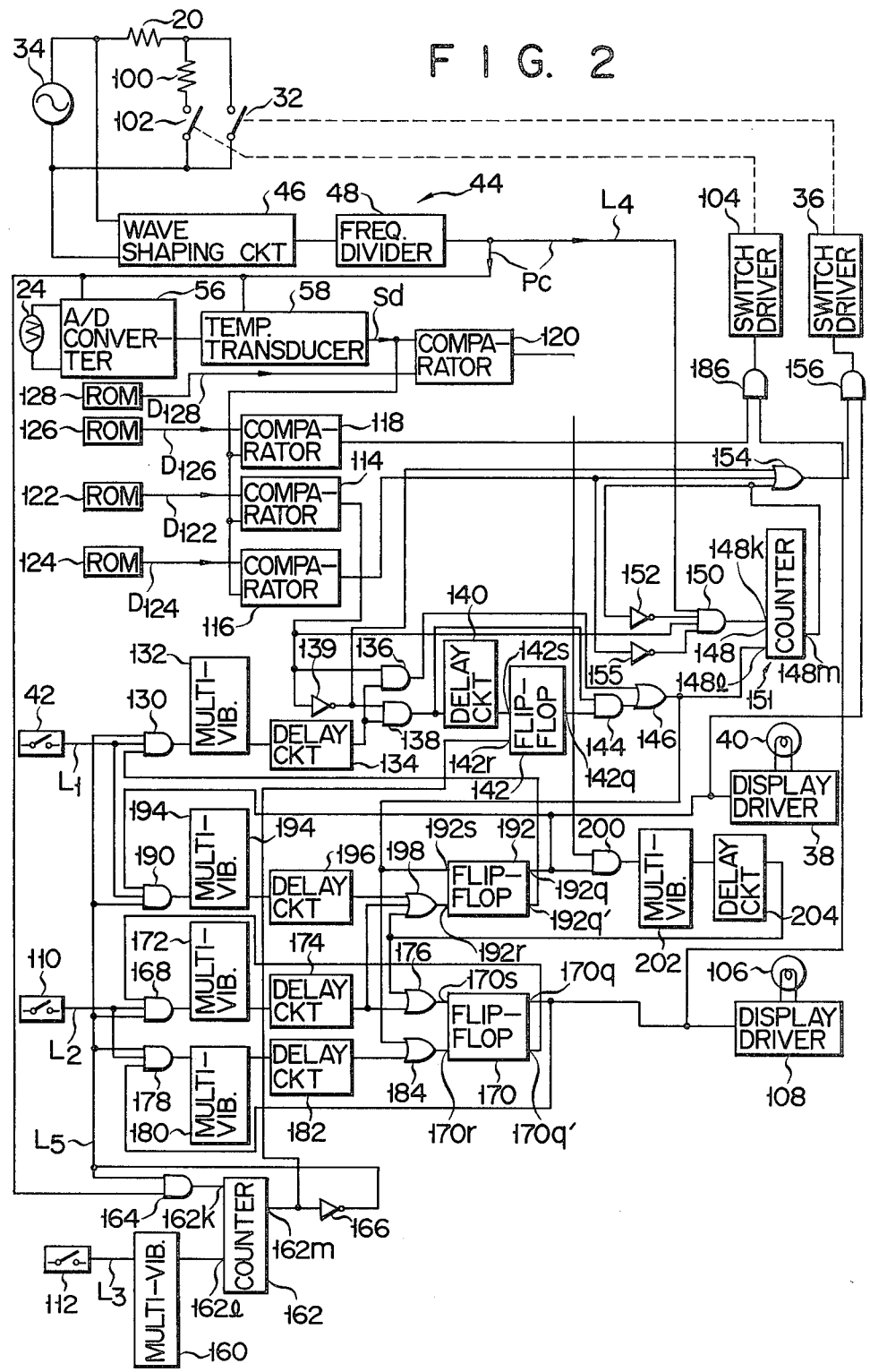

ELECTRIC RICE COOKER

BACKGROUND OF THE INVENTION

The present invention relates to an electric rice cooker and, more particularly, to an electric rice cooker for electrically heating a desired amount of rice placed in a pot or kettle with a proper amount of water and for automatically maintaining the cooked rice at a predetermined temperature in the hot plate mode. (It is noted that the term "hot plate" here indicates a device which keeps food, especially rice, warm.)

Electric rice cookers are very useful appliances in countries (including Japan) where people consume rice as a staple food, and have become prevalent in the households of such countries.

As is known among those who are skilled in the art, when cooking the rice, the temperature must be properly controlled so that the rice properly absorbs water.

In a conventional electric rice cooker such as an electric rice cooker disclosed in Japanese Patent Disclosure (KOKAI) No. 53-63174, the cooking heater is deenergized after a predetermined time interval, determined solely by a delay circuit, has elapsed after cooking is started. When a further given time interval has elapsed, power is supplied again to the cooking heater so as to restore the cooking state. The heater stops heating the rice at the earlier point in time in order to allow the rice to absorb moisture.

However, in the electric rice cooker of the prior art described above, the time interval for allowing the rice to absorb moisture is determined independently of the actual temperature of the kettle, so that the start time for allowing the rice to absorb the moisture, that is, the time for deenergizing the cooking heater, cannot be properly determined in accordance with the actual temperature of the kettle. As a result, the rice can hardly be cooked to the desired softness and stickiness.

SUMMARY OF THE INVENTION

It is, therefore, an object of the present invention to provide a new and improved electric rice cooker which deenergizes a cooking heater at the proper time after cooking is started, to allow the rice to effectively absorb moisture, thereby cooking tasty rice, by monitoring the actual temperature of the kettle.

The electric rice cooker according to the present invention, comprises a cooking kettle for containing the rice and water, a removable lid covering the top of the kettle, an electrical heater which is provided adjacent to the outside surface of the kettle and which heats the kettle and contents thereof, and a thermal insulating frame which supports and encloses the kettle and the heater. In the electric rice cooker, a measuring device is provided which measures the actual temperature of the kettle at a predetermined time and produces a first electrical signal corresponding to the measured kettle temperature. A control device is connected to the cooking heater and the measuring device and discriminates which temperature range among a plurality of temperature ranges corresponds to the measured kettle temperature. Based on the detected data, the control device controls the energization of the cooking heater to maintain the kettle temperature at a suitable temperature at least once during the early period of cooking.

According to the present invention, the rice and water which are contained in the kettle are maintained at a suitable temperature in accordance with the actual temperature of the kettle prior to the start of cooking, so that the rice will suitably absorb water during cooking. Therefore, tasty rice can be automatically cooked.

BRIEF DESCRIPTION OF THE DRAWINGS

The present invention is best understood by reference to the accompanying drawings, in which:

FIG. 2 is a circuit diagram of the electric rice cooker shown in FIG. 1.

DETAILED DESCRIPTION OF THE PREFERRED EMBODIMENT

Figure 1:
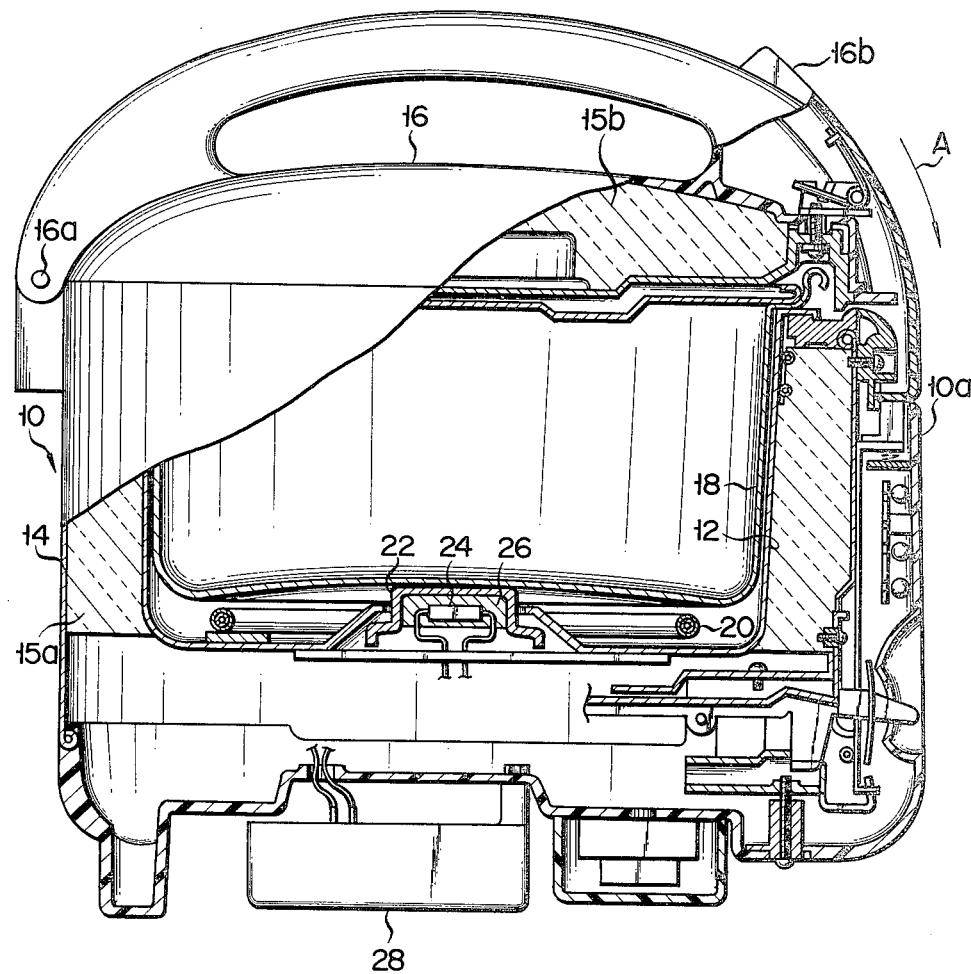
FIG. 1 is a side view schematically showing the section of the main part of an electric rice cooker according to an embodiment of the present invention.

Referring now to FIG. 1, there is illustrated an electric rice cooker in accordance with one embodiment of the present invention. In FIG. 1, a main body 10 of the rice cooker includes an inner case 12 and an outer case 14. A thermal insulating material 15a is sandwiched between the inner and outer cases 12 and 14. A lid member 16 has a thermal insulating material 15b therein. The lid member 16 is mounted at an upper opening (not shown) of the main body to be swingable or movable in the direction indicated by arrow A about a hinge shaft 16a. When the lid member 16 is tightly closed, an engaging member 16b which is disposed opposing the hinge shaft 16a of the lid member 16 engages an engaging member 10a of the main body 10, thereby tightly closing the main body 10. The internal space of the main body is substantially thermally insulated from the outer atmosphere.

A pot or kettle 18 which contains rice (not shown) to be cooked and a proper amount of water (not shown) is placed inside the inner case 12 of the main body 10. A cooking heater 20, for heating the kettle 18 detachably placed in the inner case 12, and a heater for maintaining the rice at a predetermined temperature (to be referred to as a hot plate heater (not shown in FIG. 1)) are provided at the inner bottom portion of the inner case 12. When the kettle 18, containing rice and water, is placed in the main body 10, the cooking heater 20 is adjacent to the outer surface of the kettle 18 and directly heats the rice and water contained in the kettle 18.

A cup-shaped heat sensor 22 is disposed substantially at the center of the inner bottom surface of the inner case 12 so as to be brought into tight and elastic contact with the outer bottom surface of the kettle 18 placed in the inner case 12. The heat sensor 22 has a thermally sensitive resistor (thermistor) 24 which serves as a temperature sensor therein. The thermistor 24 is stably encapsulated within a molded member 26 which comprises a good heat-conductive material. The temperature of the kettle 18 is detected by the heat sensor 22. At this time, the thermistor 24 changes its resistance in accordance with the detected temperature. A case 28 is disposed at the outer bottom portion of the outer case 14 of the main body 10 of the rice cooker and has a cooking control section. The mechanical construction of the electric rice cooker of this type is known and fully described in U.S. Pat. No. 4,315,138 of Miwa or U.S. Pat. No. 4,315,139 of Ohnishi et al. Therefore, the disclosure is hereby incorporated by reference.

FIG. 2 shows the cooking control circuit arranged in the case 28 in detail. The cooking heater 20 is electrically connected to an AC power source 34, which is commercially supplied to the household, through a normally-open cooking heater switch 32 via a plug-receptacle assembly. The cooking heater switch 32 is controlled by a switch driver 36 which is ON in response to a signal of logic level "1". Reference numeral 38 denotes a display driver for driving an indicator lamp 40 which indicates the cooking mode in response to a signal of logic level "1". A cooking start/stop switch 42 (to be referred to as a cooking switch 42 hereinafter) is manually operated by the operator or user. When the operator presses the cooking switch 42, the cooking switch 42 produces a signal of logic level "1" which is then supplied to a line $L_1$.

Two terminals of the AC power source 34 are connected to a wave shaping circuit 46 which shapes the waveform of the output from the AC power source 34 and which is incorporated in a pulse generator 44. The pulse generator 44 also includes a frequency divider circuit 48 connected to the wave shaping circuit 46 to frequency-divide the output from the wave shaping circuit 46. The frequency divider 48 is arranged to produce a clock pulse Pc of 1 Hz frequency, for example, according to a known manner. The clock pulse Pc is supplied to an A/D converter 56 connected to the thermistor 24 in FIG. 1 and a temperature transducer 58 connected to the A/D converter 56. Every time the A/D converter 56 receives an input signal from the thermistor 24 representing a change in resistance and having an analog value, and also receives a clock pulse Pc from the pulse generator 44, it converts the analog resistance data to digital resistance data. The temperature transducer 58 receives a digital output signal from the A/D converter 56 and transduces it to a digital temperature value. The temperature transducer 58 then produces a digitized temperature detection signal Sd corresponding to the actual kettle temperature Td detected by the thermistor 24.

A series circuit of the hot plate heater 100 and a normally-open hot plate heater switch 102 is connected in parallel with the cooking heater switch 32. The hot plate heater switch 102 is connected to a switch driver 104 which closes the hot plate heater switch 102 in response to a signal of logic level "1". Reference numeral 106 denotes a hot plate indicator lamp which is connected to a display driver 108 which drives it in response to a signal of logic level "1".

In addition to the cooking switch 42, a switch is provided to serve as a hot plate start/stop switch 110 (to be referred to as a hot plate switch 110 hereinafter), and another switch is provided to serve as a set switch 112 to select one of the cooking and hot plate modes when the operator presses the cooking switch 42 and the hot plate switch 110. When the operator presses the switches 42, 110 and 112, they supply signals of logic level "1" to lines $L_1$, $L_2$, and $L_3$, respectively.

The output terminal of the temperature transducer 58 connected to the thermistor 24 through the A/D converter 56 is connected to one input of each one of the comparators 114, 116, 118 and 120. The other input of each one of the comparators 114, 116, 118 and 120 is connected to data memories 122, 124, 126 and 128, respectively, which comprise ROMs. The data memory 122 stores first temperature data $D_{122}$ indicating a first reference temperature $T_{122}$ (e.g., 60° C.). The data memory 124 stores second temperature data $D_{124}$ indicating a second reference temperature $T_{124}$ (e.g., 45° C.) which is lower than the first reference temperature $T_{122}$. The data memory 126 stores hot plate temperature data $D_{126}$ indicating a hot plate temperature $T_{126}$ (e.g., 70° C.). The data memory 128 stores cooked rice temperature data $D_{128}$ indicating a cooked rice temperature $T_{128}$ (e.g., 120° C.). The comparator 120 receives the digitized temperature detection signal Sd and the cooked rice temperature data $D_{128}$. When the level of the digitized temperature detection signal Sd is higher than that of the cooked rice temperature data $D_{128}$ indicating the cooked rice temperature $T_{128}$, the comparator 120 produces a signal of logic level "1". Otherwise, the comparator 120 produces a signal of logic level "0". Similarly, when the level of the digitized temperature detection signal Sd is higher than those of the data $D_{122}$, $D_{124}$ and $D_{126}$ respectively indicating the temperatures $T_{122}$, $T_{124}$ and $T_{126}$, the comparators 114, 116 and 118 respectively produce signals of logic level "1". Otherwise, the comparators 114, 116 and 118 respectively produce signals of logic level "0".

The cooking switch 42 is connected to one input terminal of each one of the AND networks or AND gates 136 and 138 through a 3-input AND gate 130, a multivibrator 132 and a delay circuit 134. The output terminal of the comparator 114 is connected to the other input terminal of the AND gate 138 through an inverter 139. The AND gate 136 has its other input terminal directly connected to the output terminal of the comparator 114. The output terminal of the AND gate 138 is connected through a delay circuit 140 to a set input terminal 142s of an R-S flip-flop 142 having an output terminal 142q connected to one input terminal of an AND gate 144. The AND gate 144 has its other input terminal directly connected to the output terminal of the AND gate 138. The output terminals of the two AND gates 136 and 144 are connected to an OR gate 146 having its output terminal connected to a clear terminal 148l of a pulse counter 148. The pulse counter 148 and a 4-input AND gate 150 constitute a timer circuit 151. When the count of the pulse counter 148 reaches "300", that is, when 300 seconds or 5 minutes have elapsed after the pulse counter 148 starts counting the pulses, the output signal from its output terminal 148m becomes high. The counter 148 has a clock input terminal 148k which is connected to the output terminal of the 4-input AND gate 150. The 4-input AND gate 150 has a first input terminal connected to a line $L_4$ so as to receive the clock pulse Pc, a second input terminal connected through an inverter 152 to a first input terminal of a 3-input OR gate 154, a third input terminal connected to the output of the comparator 114, and a fourth input terminal connected through an inverter 155 to both the output terminal of the comparator 116 and a second input terminal of the 3-input OR gate 154, the latter having a third input terminal connected to the output terminal of the inverter 139. The first input of the OR gate 154 is connected to the output terminal 148m of the pulse counter 148. The 3-input OR gate 154 is connected to the switch driver 36 through an AND gate 156. The pulse counter 148 counts the clock pulses Pc supplied to the clock input terminal 148k thereof. When the pulse counter 148 receives the signal of logic level "1" at its clear terminal 148l, it clears the count and produces a signal of logic level "0" from its output terminal 148m.

The set switch 112 is connected through a multivibrator 160 to a clear terminal 162l of another pulse counter 162 which is arranged in the same manner as the pulse counter 148. The pulse counter 162 has a clock input terminal 162k connected to the output of an AND gate 164 which is supplied with the clock pulse Pc at one input end thereof. An output terminal 162m of the counter 162 is connected to a reset terminal 142r of the R-S flip-flop 142 and also to the other input terminal of the AND gate 164 through an inverter 166. When the count of the pulse counter 162 reaches "5", that is, when 5 seconds have elapsed after the pulse counter 162 starts counting the pulses, an output signal from its output terminal 162m becomes high.

The hot plate switch 110 is connected firstly to a 3-input AND gate 168 having its output terminal connected to a set terminal 170s of an R-S flip-flop 170 through a series circuit of a multivibrator 172, a delay circuit 174 and an OR gate 176, and secondly to a 3-input AND gate 178 having its output terminal connected to a reset terminal 170r of the R-S flip-flop 170 through a series circuit of a multivibrator 180, a delay circuit 182 and an OR gate 184. The R-S flip-flop 170 has a reset output terminal 170q' connected to the 3-input AND gate 168 and a set output terminal 170q which is connected to the 3-input AND gate 178, to the display driver 108, and to one input terminal of an AND gate 186 connected to the switch driver 104. The AND gate 186 has the other input terminal connected to the comparator 118.

The inverter 166 is connected at the output terminal thereof not only to the 3-input AND gates 130, 168 and 178, but also to a 3-input AND gate 190 which has its other two input terminals respectively connected to the cooking switch 42 and to the display driver 38 and the AND gate 156. The output terminal of the 3-input AND gate 190 is connected to a reset terminal 192r of an R-S flip-flop 192 through a series circuit of a multivibrator 194, a delay circuit 196 and a 3-input OR gate 198. The OR gate 198 has two other terminals respectively connected to two input terminals of the OR gate 176. A set input terminal 192s of the R-S flip-flop 192 is connected to the other input terminal of the OR gate 184 and to the clear terminal 148l of the pulse counter 148. A reset output terminal 192q' of the R-S flip-flop 192 is connected to one of the remaining input terminals of the 3-input AND gate 130. A set output terminal 192q of the R-S flip-flop 192 is connected to the display driver 38 and to one of the remaining terminals of the 3-input OR gate 198 through an AND gate 200, a multivibrator 202 and a delay circuit 204. The AND gate 200 has one input terminal connected to the comparator 120.

The mode of operation of the electric rice cooker according to an embodiment of the present invention will be described below. The lid member 16 is closed after the kettle 18 which contains a predetermined amount of rice and an appropriate amount of water is placed in the main body 10. When the operator presses the set switch 112, the multivibrator 160 is triggered in response to the signal of logic level "1" appearing on the line L₃. A pulse from the multivibrator 160 clears the count of the pulse counter 162. A signal of logic level "0" is produced by the pulse counter 162. The signal of logic level "0" is then inverted by the inverter 166, and the inverted signal is then supplied to one input terminal of the AND gate 164. Thus, the pulse counter 162 starts counting the clock pulses Pc passing through the AND gate 164 upon the ON state of the set switch 112. When five seconds have elapsed after the start of pulse counting, the pulse counter 162 produces a signal of logic level "1" from its output terminal 162m. This signal of logic level "1" is inverted by the inverter 166 and is supplied as a signal of logic level "0" to one input terminal of the AND gate 164. Thus, the pulse counter 162 stops counting the clock pulses Pc. In other words, the signal of logic level "1" is supplied from the inverter 166 onto the line L₅ only for a time interval of five seconds after the set switch 112 is set to ON. When the operator presses the cooking switch 42 within the five seconds, the signal of logic level "1" appears on the line L₁. The signal of logic level "1" is produced from one of the AND gate 130 and 190 in accordance with the state of the R-S flip-flop 192. In this case, if cooking is not started, the R-S flip-flop 192 produces a signal of logic level "0" from its set output terminal 192q and a signal of logic level "1" from its reset output terminal 192q'. The signals of logic level "1" are supplied to the three inputs of the 3-input AND gate 130. Therefore, the 3-input AND gate 130 produces a signal of logic level "1" therefrom. This signal triggers the multivibrator 132 which then produces a signal of logic level "1". The signal from the multivibrator 132 is supplied to one input terminal of each one of the AND gate 136 and 138 through the delay circuit 134. In this manner, when the operator presses the cooking switch 42, the control operation by the control circuit shown in FIG. 2 differs in accordance with the actual temperature of the kettle 18 as follows.

(1) When the actual temperature (corresponding to a measured temperature Td) of the kettle is lower than 45° C.:

The comparator 114 which receives the first reference temperature data $D_{122}$ from the data memory 122 and the temperature detection signal Sd indicating the measured kettle temperature Td produces a signal of logic level "1". The comparator 116 which receives the second reference temperature data $D_{124}$ from the data memory 124 and the measured kettle temperature Td also produces a signal of logic level "1". When the signal of logic level "1" is produced by the comparator 114, the AND gate 136 produces a signal of logic level "1" upon depression of the cooking switch 42. Furthermore, the AND gate 138 produces a signal of logic level "0". The signal of logic level "1" from the AND gate 136 is supplied to the clear terminal 148l of the pulse counter 148 through the OR gate 146 and also to the set input terminal 192s of the R-S flip-flop 192. Thus, the pulse counter 148 is cleared, and the R-S flip-flop 192 is set. A signal of logic level "1" is produced from the set output terminal 192q of the R-S flip-flop 192, and a signal of logic level "0" is produced from the reset output terminal 192q' thereof. The signal of logic level "1" from the set output terminal 192q of the R-S flip-flop 192 is supplied to one input terminal of the AND gate 156. A signal of logic level "1" from the comparator 116 is supplied to the other input terminal of the AND gate 156 through the OR circuit 154. Thus, a signal of logic level "1" is then supplied from the AND gate 156 to the switch driver 36.

Therefore, the switch driver 36 drives the cooking heater switch 32 to supply power from the AC power source 34 to the cooking heater 20, thereby starting cooking to allow the cooking heater 20 to heat the kettle 18. At the same time, the signal of logic level "1" from the set output terminal 192q of the R-S flip-flop 192 is supplied to the display driver 38 which drives the cooking indicator lamp 40 to go on. In this case, the signal of logic level "1" from the comparator 116 is inverted by the inverter 155 and is supplied as a signal of logic level "0" to the fourth input terminal of the AND gate 150, which disables the clock pulse Pc from passing through the AND gate 150. Thus, the pulse counter 148 may not restart counting the pulses, that is, the timer circuit 151 is not restarted. When the temperature of the kettle 18 exceeds a temperature of 45° C. after cooking is started, the relationship between the measured kettle temperature Td and the second reference temperature $D_{124}$ is reversed as $Td > T_{124}$. The output signal from the comparator 116 becomes low. In this state, the signal of logic level "0" is produced by the inverter 139, and the signal of logic level "0" is also produced by the pulse counter 148. All the inputs of the OR gate 154 are set to logic level "0", and then the output signal from the AND gate 156 becomes low. Thus, the switch driver 36 causes the cooking heater switch 32 to turn OFF to temporarily deenergize the cooking heater 20. At the same time, the signal of logic level "0" from the pulse counter 148 is inverted by the inverter 152 and is supplied as the signal of logic level "1" to the second input terminal of the AND gate 150; the signal of logic level "1" from the comparator 114 is supplied to the third input terminal of the AND gate 150; and the signal of logic level "0" from the comparator 116 is inverted by the inverter 155 and is supplied as signal of logic level "1" to the fourth input terminal of the AND gate 150. Therefore, the AND gate 150 allows the clock pulse Pc to pass at the first input terminal thereof. The pulse counter 148 then restarts counting the clock pulses Pc for five minutes. When the five minutes have elapsed, the pulse counter 148 produces a signal of logic level "1" which is inverted by the inverter 152 and is supplied as the signal of logic level "0" to the second input terminal of the AND gate 150. The counting operation of the pulse counter 148 is then interrupted, and so the operation of the timer circuit 151 is interrupted. At the same time, the signal of logic level "1" from the pulse counter 148 is supplied to the switch driver 36 through the OR gate 154 and the AND gate 156, so that the cooking heater switch 32 is ON so as to power the cooking heater 20 again. When the operator presses the cooking switch within five seconds after the set switch 112 is pressed, and when the actual temperature of the kettle 18 is lower than 45° C., the cooking heater 20 is immediately powered to heat the kettle 18. When the kettle temperature reaches 45° C., the cooking heater 20 is temporarily stopped for five minutes to allow the rice to sufficiently absorb water. Thereafter, the cooking heater 20 is powered again to continue cooking. However, after the kettle temperature reaches 45° C. and is lowered again after the cooking heater 20 is temporarily deenergized, the signal of logic level "1" is produced by the comparator 116. The cooking heater 20 is powered and at the same time the timer operation of the timer circuit 151 is interrupted. When the kettle temperature reaches 45° C. again, the cooking heater is deenergized again, and at the same time, the timer circuit 151 is started. The above operation is repeated to assure five minutes at which the kettle temperature is kept above 45° C. while the cooking heater 20 is deenergized.

(2) When the temperature (measured temperature Td) of the kettle 18 is within a range of 45° C. to 60° C.:

Since the signal of logic level "1" is produced by the comparator 114 upon depression of the cooking switch 42, the signal of logic level "1" from the AND gate 136 clears the contents of the pulse counter 148 and sets the R-S flip-flop 192. However, in this case, the comparator 120 produces a signal of logic level "0" and the pulse counter 148 and the inverter 140 respectively produce signals of logic level "0", so that a signal of logic level "1" is not produced from the OR gate 154 nor from the AND gate 156. The switch driver 36 does not drive the cooking heater switch 32, thereby keeping the cooking heater 20 OFF. Further, since the comparator 116 produces the signal of logic level "0", the second to fourth input terminals of the AND gate 150 are set to a high level. Thus, the pulse counter 148 starts counting the clock pulses Pc passing through the AND gate 150. When five minutes have elapsed after the pulse counter starts counting the pulses, the counting operation of the counter 148 and the timer operation of the timer circuit 151 are interrupted in the same manner as described above. The switch driver 36 drives the cooking heater switch 32 to power the cooking heater 20. At the time when the cooking switch 42 is turned on within five seconds after the set switch 112 is presed, when the kettle temperature is within a range of 45° C. to 60° C., the cooking heater 20 is kept OFF for five minutes. When the five minutes have elapsed, power is supplied to the cooking heater 20. In the time interval corresponding to five minutes at which the cooking heater 20 is OFF, the rice sufficiently absorbs water.

(3) When the temperature (measured temperatures Td) exceeds 60° C.:

Signals of logic level "0" are produced by the comparators 114 and 116. The AND gate 138 produces the signal of logic level "0". However, when the operator presses the cooking switch 42, the AND gate 138 produces the signal of logic level "1" which is then supplied to the first input terminal of the AND gate 144 and to the set input terminal 142s of the R-S flip-flop 142 through the delay circuit 140. Thus, the R-S flip-flop 142 is set. At this time, the delay time of the delay circuit 140 is greater than the time constant of the multivibrator 132 which determines a pulse width of the signal of logic level "1" from the AND gate 138. When the R-S flip-flop 142 is set as described above and the signal of logic level "1" is supplied from its set output terminal 142q to the second input terminal of the AND gate 144, the signal of logic level "1" disappears at the first input terminal of the AND gate 144. The AND gate 144 is set to logic level "0". In this condition, since the AND gate 136 produces the signal of logic level "0", the R-S flip-flop 192 may not be set, and the signal of logic level "1" may not be supplied to the switch driver 36 and the display driver 38. The cooking heater 20 is thus not powered, and an indicator lamp (not shown) does not go on either. When the operator presses the cooking switch 42 again within five seconds after pressing the set switch 112 and after pressing the cooking switch 42 once, the signal of logic level "1" is supplied from the AND gate 138 to the first input terminal of the AND gate 144. At this time, since the signal of logic level "1" from the R-S flip-flop 142 is supplied to the second input terminal of the AND gate 144, the signal of logic level "1" is produced by the AND gate 144, and the R-S flip-flop 192 is then set. The signal of logic level "1" from the set output terminal 192q of the R-S flip-flop 192 is supplied to one input terminal of the AND gate 156 and to the display driver 38. At this time, since the signal of logic level "1" from the inverter 139 is supplied to the other terminal of the AND gate 156, the signal of logic level "1" from the AND gate 156 is supplied to the switch driver 36. The cooking heater 20 is then powered again. In this case, since the clock pulse Pc does not pass through the AND gate 150 which receives the signal of logic level "0" from the comparator 114, the pulse counter 148 does not perform counting. When the operator presses the cooking switch 42 within five seconds after the set switch 112 is pressed, and when the temperature of the kettle 18 exceeds 60° C., cooking is restarted when the cooking switch 42 is pressed for a second time within five seconds after the set switch 112 is pressed.

In cases (1), (2) and (3), when the temperature of the kettle 18 exceeds a temperature of 120° C., the comparator 120, which receives data of the measured temperature Td indicated by detection signal Sd and the cooked rice temperature data $D_{128}$ (120° C.) which is stored in the data memory 128, becomes high. The signal of logic level "1" from the comparator 120 is supplied to one input terminal of the AND gate 200. The signal of logic level "1" from the R-S flip-flop 192 is supplied to the other input terminal of the AND gate 200. The signal of logic level "1" from the AND gate 200 triggers the multivibrator 202. The signal of logic level "1" from the multivibrator 202 is supplied to the reset input terminal 192r of the R-S flip-flop 192 through the delay circuit 204 and the OR gate 198. The R-S flip-flop 192 is reset and the set output terminal 192q thereof becomes low. The signal of logic level "1" is thus not supplied to the switch driver 36 or the display driver 38. The cooking heater switch 32 is OFF to deenergize the cooking heater 20. At the same time, the cooking indicator lamp 40 goes off. Thus, cooking is completed. When cooking is completed, that is, when the R-S flip-flop 192 is reset, the signal of logic level "1" passing through the delay circuit 204 is supplied to the set input terminal 170s of the R-S flip-flop 170 through the OR gate 176, so that the R-S flip-flop 170 is set to produce the signal of logic level "1" from its set output terminal 170q. The hot plate operation is then performed in accordance with the set status of the R-S flip-flop 170. Since the signal of logic level "1" from the R-S flip-flop 170 is supplied to the hot plate display driver 108, the hot plate indicator lamp 106 goes on. Furthermore, the above signal of logic level "1" is supplied to one input terminal of the AND gate 186, so that the switch driver 104 which receives the output from the AND network 186 is controlled by the output from the comparator 118 which is supplied to the other input terminal of the AND gate 186. The comparator 118 receives data of the measured temperature Td and the hot plate temperature data $D_{126}$ (70° C.) which is stored in the data memory 126. When the temperature of the kettle 18 drops to 70° C. after cooking is completed, the comparator 118 produces a signal of logic level "1". This signal from the comparator 118 is supplied to the switch driver 104 through the AND gate 186, so that the switch driver 104 drives the hot plate heater switch 102, which is then ON, to power the hot plate heater 100. When the temperature of the kettle 18 exceeds 70° C. upon energization of the hot plate heater 100, the output from the comparator 118 becomes low. The signal of logic level "0" is supplied to the switch driver 104, so that the hot plate heater switch 102 turns OFF, and the hot plate heater 100 is deenergized. Upon the ON/OFF operation of the hot plate heater switch 102, the hot plate heater 100 is intermittently powered to perform the hot plate operation. In the state where the signal of logic level "1" from the OR gate 146 causes the RF flip-flop 192 to reset, that is, in the state where cooking is performed, the signal of logic level "1" from the OR gate 146 is supplied to the reset input terminal 170r of the RF flip-flop 170 which is then reset. The hot plate heater 100 may not be powered, and the hot plate indicator lamp 106 may not go on in this state.

In order to stop the hot plate operation to access the cooked rice, the operator presses the set switch 112 and presses the hot plate switch 110 within five seconds after the set switch 112 is pressed. The signal of logic level "1" appears on the lines $L_2$ and $L_5$. However, when the hot plate mode is initiated, the signal of logic level "1" is produced from the set output terminal 170q of the RF flip-flop 170, so that the signals of the logic level "1" are supplied to all three of the input terminals of the AND gate 178. The AND gate 178 produces the signal of logic level "1", thus triggering the multivibrator 180. The signal of logic level "1" from the multivibrator 180 is supplied to the reset input terminal 170r of the R-S flip-flop 170 through the delay circuit 182 and the OR gate 184. Thus, the R-S flip-flop 170 is reset to terminate the hot plate mode.

In order to initiate the hot plate mode, the operator presses the hot plate switch 110 within five seconds after the set switch 112 is pressed in the same manner as the operation for stopping the hot plate mode. Thus, the signal of logic level "1" appears on the lines $L_2$ and $L_5$. In this case, since the hot plate mode is not initiated, the signal of logic level "1" is produced from the reset output terminal 170q' of the R-S flip-flop 170. The signals of logic level "1" are supplied to all three of the input terminals of the AND gate 168 which then produces the signal of logic level "1". This signal triggers the multivibrator 172 which then supplies the signal of logic level "1" to the set input terminal 170s of the R-S flip-flop 170 through the delay circuit 174 and the OR gate 176. Thus, the R-S flip-flop 170 is set to initiate the hot plate mode. When the R-S flip-flop 170 is set, the R-S flip-flop 192 is reset by the signal of logic level "1" from the delay network 174.

However, in order to terminate the cooking mode, the operator presses the cooking switch 42 within five seconds after the set switch 112 is pressed. The signal of logic level "1" appears on the lines $L_1$ and $L_5$. Since the signal of logic level "1" is produced from the set output terminal 192q of the R-S flip-flop 191 when the cooking mode is initiated, the signals of logic level "1" are supplied to all three of the input terminals of the AND gate 190 which then produces a signal of logic level "1". The multivibrator 194 is then triggered, and the signal of logic level "1" therefrom is supplied to the reset input terminal 192r of the R-S flip-flop 192 through the delay circuit 196 and the OR gate 198. The R-S flip-flop 192 is then reset to disable the switch driver 104 and the display driver 106. As a result, the cooking mode is terminated.

In the above electric rice cooker according to an embodiment of the present invention, the actual temperature of the kettle before cooking is started is measured. The kettle temperature is properly detected to determine if it is in the first temperature range of lower than 45° C., the second temperature range of 45° C. to 60° C., or the third temperature range of higher than 60° C. In accordance with the above detection, the deenergization of the cooking heater 20 is controlled to allow the rice to absorb water. Therefore, the step of allowing the rice to absorb water can be properly performed in accordance with the actual temperature of the kettle 18 containing the rice and water. At the very beginning of cooking, initiated by the cooking switch 42, when the temperature of the kettle 18 containing the rice and water and placed in the main body 10 is lower than 60°

C., the kettle 18 is kept above approximately 45° C. for at least five minutes before the cooking heater 20 is stopped. During this period of time, since the temperature of the water contained in the kettle 18 is considerably increased, the rice in the kettle 18 effectively absorbs water. The same effect as the case where the rice is left soaking in water at room temperature within a long period of time before cooking is started can be obtained within a short period of time to obtain tasty rice. The deenergization of the cooking heater 20 is always performed at a temperature (about 65° C.) which is lower than the temperature at which the beta-starch of the rice is changed to the alpha-starch thereof. The step of allowing the rice to absorb water properly prevents adverse affects on the normal cooking operation. Thus, the operator can cook tasty rice.

According to the electric rice cooker of the type described above, the set switch 112 is used in association with the cooking switch 42 and the hot plate switch 110. When the operator presses only the cooking switch 42 or the hot plate switch 110, neither the cooking nor the hot plate mode can be initiated or terminated. The operator must press the cooking switch 42 or the hot plate switch 110 within five seconds after the set switch 112 is pressed, thereby initiating the cooking or hot plate mode. Specifically, when the operator wishes to set the cooking mode, he/she presses the set switch 112 and then the cooking switch 42, thus requiring two switching operations. This may seem a rather complex key operation. However, the operator can unconsciously confirm the desired operation by pressing a plurality of switches, and erroneous operation is prevented. The above effect entails further advantages.

When the operator sets the start of cooking in the conventional electric rice cooker and starts cooking the rice, without noticing or forgetting that the current temperature of the kettle containing the rice and water has exceeded a temperature of 60° C., the cooked rice scorches and sticks to the bottom of the kettle 18. This tends to occur when the cooking heater is accidentally deenergized in the hot plate mode due to a power failure or the like. The above disadvantage can be eliminated by arranging the set switch 112 according to the present invention, thus completely preventing this problem.

In daily cooking using the electric rice cooker, the operator may change the amounts of rice and water after he/she presses the cooking switch. In this case, the operator presses the cooking switch twice within five seconds after the set switch 112 is pressed. Furthermore, in order to start the cooking operation when the temperature of the kettle 18 exceeds 60° C., when five minutes have elapsed during which the temperature of the kettle 18 is kept above 45° C., the timer circuit 151 may not be operated, and cooking is immediately started, thus preventing prolongation of cooking time.

The cooking switch 42 used for supplying power to the cooking heater 20 and the hot plate switch 110 used for supplying power to the hot plate heater 100 are operative only when they are pressed within five seconds (for which the timer operation by the timer circuit 151 is performed) after the set switch 112 is pressed. Therefore, even if the operator erroneously presses the cooking switch 42 or the hot plate switch 100, power may not be automatically supplied to the cooking heater 20 or the hot plate heater 100, thus preventing an accident due to heating the kettle while it is empty. Therefore, touch-controlled switches can be used as the cooking and hot plate switches 42 and 100. In this case, the set switch 112 may also be arranged by a touch-controlled switch. The start/stop control of the cooking mode and the start/stop control of the hot plate mode can be performed by the cooking switch 42, the hot plate switch 110 and the set switch 112, by incorporating the R-S flip-flop 192 which stores data indicating whether or not the cooking mode is initiated and the R-S flip-flop 170 which stores data indicating whether or not the hot plate mode is initiated. The number of contacts of the switches is limited, resulting in simple construction.

Although the present invention has been shown and described with respect to the particular embodiment, nevertheless, various changes and modifications which are obvious to a person skilled in the art to which the invention pertains are deemed to lie within the spirit, scope and contemplation of the invention.

In the above embodiment, the cooking/hot plate control circuit is arranged in a hardware manner incorporating the logic circuits and function blocks. However, a program of a microcomputer may be used to obtain the same effect as the above cooking/hot plate control circuit.

In the above embodiment, the R-S flip-flop 142 is used to store data indicating the number of operations. However, a plurality of memories each of which has the same configuration of the R-S flip-flop 142 may be used. In this case, when the temperature of the kettle 18 exceeds 60° C. at the setting operation for cooking, the operator must press the cooking switch 42 three times within five seconds after the set switch 112 is pressed so as to initiate the cooking mode.

What we claim is:

1. An apparatus for electrically cooking rice with an appropriate amount of water, said apparatus comprising:
   a cooking kettle for containing the rice and water;
   a removable lid covering the top of said kettle;
   electrical heater means provided adjacent to the outside surface of said kettle, for heating said kettle and the contents thereof;
   thermal insulating frame means for supporting and enclosing said kettle and said heater means;
   measuring means for measuring the actual kettle temperature at a predetermined time to produce a first electrical signal corresponding to the actual kettle temperature; and
   controlling means, connected to said heater means and said measuring means, for determining into which one of a plurality of predetermined temperature ranges the actual kettle temperature falls, in response to the first electrical signal, and for controlling said heater means so as to maintain said cooking kettle at least once at a suitable temperature for a first predetermined time interval at the beginning of cooking operation based on which predetermined temperature range said actual kettle temperature falls, whereby the rice in said cooking kettle effectively absorbs water at the suitable temperature in the beginning of the cooking operation in accordance with the actual kettle temperature.

2. An apparatus according to claim 1, wherein said controlling means comprises:
   memory means for storing data of a first predetermined reference temperature which is lower than the boiling point of water and data of a second predetermined reference temperature which is lower than the first predetermined reference temperature to produce second and third electrical signals corresponding to the first and second predetermined reference temperatures, respectively; and comparator means, connected to said measuring means and said memory means, for comparing the first electrical signal and the second electrical signal, and the first electrical signal and the third electrical signal to determine into which one of at least three temperature ranges, defined by dividing a predetermined temperature range by the first and second predetermined reference temperatures, the actual kettle temperature falls, and for producing an output signal indicating the temperature range in which said actual kettle temperature range falls.

3. An apparatus according to claim 2, wherein said controlling means further comprises:

first switching means, connected to said heater means and adapted to be connected to an external electric power source, for controlling power supply to said heater means by a switching operation; and switch driving means, connected to said comparator means and said first switching means, for receiving the output signal from said comparator means and closing said first switching means when the actual kettle temperature indicated by the output signal is lower than the first reference temperature, whereby power is supplied to said heater means.

4. An apparatus according to claim 3, wherein said controlling means further comprises:

timer means, connected to said comparator means and said switch driving means, for receiving the output signal from said comparator means, for starting a counting operation when the actual kettle temperature is higher than the first reference temperature, and for temporarily interrupting the closure of said switch driving means to deenergize said heater means until the first predetermined time interval has elapsed after the counting operation is started so as to maintain said cooking kettle at least once at a temperature substantially the same as the first reference temperature for the first predetermined time interval before cooking is started.

5. An apparatus according to claim 4, further comprising:

second switching means, provided on the outer surface of said thermal insulating frame means, for generating an operation signal indicating at least the beginning of cooking when an operator manually operates said second switching means;

third switching means, provided adjacent to said second switching means on the outer surface of said thermal insulating frame means, for generating a set signal when the operator manually operates said third switching means; and manual operation assuring means, connected to said second and third switching means and to said switch driving means, for preventing a driving operation of said switch driving means when the operation signal is received at a second predetermined time interval from the generation of said set signal.

6. An apparatus according to claim 5, wherein the first predetermined time interval is set in units of minutes, and the second predetermined time interval is set in units of seconds.

7. An apparatus according to claim 6, wherein the first reference temperature is set at a temperature which is lower than the temperature at which the beta-starch of rice is changed to alpha-starch and corresponds to data stored in said memory means, said first reference temperature being preferably set at approximately 60° C.

8. An apparatus according to claim 5, wherein said manual operation assuring means comprises circuit means, connected to said second and third switching means, said comparator means, said timer means and said switch driving means, for properly stopping the operation of said timer means when the actual kettle temperature indicated by the output signal from said comparator means is higher than the second predetermined reference temperature, and for allowing said switch driving means to perform the driving operation when said circuit means receives the operation signal twice within the second predetermined time interval after receiving the set signal.

9. An electric rice cooker comprising:

a kettle for containing rice and water;

a lid removably covering the top of said kettle;

heater means for electrically heating said kettle;

a thermal insulating frame structure for supporting and enclosing said kettle and said heater means;

means for detecting the actual temperature of said kettle to produce a detection signal;

memory means for storing data of a first predetermined reference temperature which is lower than the boiling point of water and data of a second predetermined reference temperature which is lower than the first predetermined reference temperature to generate first and second electrical signals which correspond to the first and second reference temperatures, respectively; and control circuit means, connected to said heater means, said temperature detecting means and said memory means, for controlling the kettle-heating operation of said heater means so as to maintain said kettle at a temperature higher than at least the first reference temperature for a predetermined time interval when the actual kettle temperature indicated by the detection signal is lower than the first reference temperature in the case of performing a setting operation which designates a beginning of cooking in said electric rice cooker, and for temporarily interrupting the operation of said heater means for the predetermined time interval when the actual kettle temperature is kept between the first and second reference temperatures, whereby the rice is kept at a temperature higher than the first reference temperature for the predetermined time interval to effectively absorb the water before cooking is performed.

10. An electric rice cooker according to claim 9, wherein said control circuit means comprises:

first circuit means, connected to said temperature detecting means and said memory means, for producing a first data signal when the actual kettle temperature is lower than the second reference temperature and for producing a second data signal when the actual kettle temperature is lower than the first predetermined reference temperature and is higher than the second predetermined reference temperature;

second circuit means, connected to said first circuit means, for receiving the first data signal to produce a first digital signal of a first predetermined logic level in response to the first data signal;

third circuit means, connected to said first circuit means, for receiving the second data signal to produce a second digital signal which has a second logic level until the predetermined time interval has elapsed when said third circuit means receives the second data signal and which has the first logic level after the predetermined time interval; and fourth circuit means, connected to said second and third circuit means, for allowing supply of electric power to said heater means when the first and second digital signals are set at the first logic level.

* * * * *